United States Patent
Yang

(10) Patent No.: US 10,827,560 B2
(45) Date of Patent: Nov. 3, 2020

(54) DUAL-MODE LOW-POWER WIDE-AREA NETWORK CHIP, METHOD FOR DATA TRANSMISSION, AND TERMINAL

(71) Applicant: Guangdong Oppo Mobile Telecommunications Corp., Ltd., Guangdong (CN)

(72) Inventor: Xin Yang, Guangdong (CN)

(73) Assignee: GUANGDONG OPPO MOBILE TELECOMMUNCATIONS CORP., LTD., Dongguan (CN)

(*) Notice: Subject to any disclaimer, the term of this patent is extended or adjusted under 35 U.S.C. 154(b) by 0 days.

(21) Appl. No.: 16/536,873

(22) Filed: Aug. 9, 2019

(65) Prior Publication Data
US 2020/0053832 A1 Feb. 13, 2020

(30) Foreign Application Priority Data
Aug. 10, 2018 (CN) .......................... 2018 1 0911719

(51) Int. Cl.
*H04B 1/38* (2015.01)
*H04W 88/10* (2009.01)
(Continued)

(52) U.S. Cl.
CPC .......... *H04W 88/10* (2013.01); *H04W 76/15* (2018.02); *H04W 84/18* (2013.01); *H04W 88/085* (2013.01)

(58) Field of Classification Search
CPC ..... H04W 36/30; H04W 88/06; H04W 88/02; H04W 16/06; H04W 16/32; H04W 76/02; H04W 48/18; H04M 1/72519
(Continued)

(56) References Cited

U.S. PATENT DOCUMENTS

2009/0325490 A1* 12/2009 Lin ........................ H04J 3/0685
455/41.2
2011/0313922 A1* 12/2011 Ben Ayed .............. G06Q 30/06
705/42
(Continued)

FOREIGN PATENT DOCUMENTS

CN      101110624 A      1/2008
CN      103916166 A      7/2014
(Continued)

OTHER PUBLICATIONS

International search report for PCT/CN2019/099648 dated Oct. 30, 2019.
(Continued)

*Primary Examiner* — Temica M Beamer

(57) ABSTRACT

Provided are a dual-mode low-power wide-area network (LPWAN) chip, a method for data transmission, and a terminal. The method is applicable to a terminal and includes the following. A LPWAN chip is enabled to establish a communication connection with an LPWAN input/output device and to establish a communication connection with an external device. The terminal includes the dual-mode LPWAN chip, and the dual-mode LPWAN chip includes a first LPWAN radio frequency (RF) module, a second LPWAN RF module, and an LPWAN baseband chip coupled with the first LPWAN RF module and the second LPWAN RF module. First data is received, with the first LPWAN RF module, from the LPWAN input/output device over a first channel. The first data is processed into second data with the LPWAN baseband chip. The second data is transmitted, with the second LPWAN RF module, to the external device over a second channel.

19 Claims, 8 Drawing Sheets

(51) Int. Cl.
  *H04W 76/15* (2018.01)
  *H04W 84/18* (2009.01)
  *H04W 88/08* (2009.01)
(58) Field of Classification Search
  USPC .............. 455/550.1, 552.1, 553.1, 443, 41.2
  See application file for complete search history.

(56) References Cited

U.S. PATENT DOCUMENTS

| | | | |
|---|---|---|---|
| 2013/0273849 A1* | 10/2013 | Sharma | H04R 5/033 455/41.2 |
| 2014/0181698 A1* | 6/2014 | Choi | H04L 51/046 715/758 |
| 2015/0004913 A1 | 1/2015 | Linde et al. | |
| 2016/0227354 A1 | 8/2016 | Zhao et al. | |
| 2017/0019873 A1 | 1/2017 | Britt | |
| 2017/0110005 A1 | 4/2017 | Yang et al. | |
| 2018/0132082 A1 | 5/2018 | Vijayan et al. | |
| 2019/0312752 A1* | 10/2019 | Nogueira-Nine | H04B 1/401 |
| 2019/0393932 A1* | 12/2019 | Hsu | H04W 80/02 |

FOREIGN PATENT DOCUMENTS

| | | |
|---|---|---|
| CN | 104467925 A | 3/2015 |
| CN | 104553379 A | 4/2015 |
| CN | 106030455 A | 10/2016 |
| CN | 106658366 A | 5/2017 |
| CN | 106686541 A | 5/2017 |
| CN | 107222233 A | 9/2017 |
| CN | 206775493 U | 12/2017 |
| CN | 207266011 U | 4/2018 |
| EP | 1372299 A1 | 12/2003 |
| WO | 2010038970 A3 | 7/2010 |

OTHER PUBLICATIONS

Partial European search report issued in corresponding European application No. 19191047.0 dated Jan. 13, 2020.
The extended European search report issued in corresponding European application No. 19191047.0 dated Jun. 23, 2020.
English translation of the second office action issued in corresponding CN application No. 2018109117199 dated Jul. 3, 2020.

* cited by examiner

DUAL-MODE LOW-POWER WIDE-AREA NETWORK CHIP, METHOD FOR DATA TRANSMISSION, AND TERMINAL

CROSS-REFERENCE TO RELATED APPLICATION(S)

This application claims priority to Chinese Patent Application No. 201810911719.9, filed on Aug. 10, 2018, the disclosure of which is hereby incorporated by reference in its entirety.

TECHNICAL FIELD

The present disclosure relates to the technical field of terminals, and particularly to a dual-mode low-power wide-area network chip, a method for data transmission, and a terminal.

BACKGROUND

At present, terminals are generally provided with Bluetooth® modules or wireless fidelity (Wi-Fi) modules, for example, to connect with peripheral equipment using a single Bluetooth chip in time division duplex (TDD) mode, which can achieve point-to-point data sharing within a local area network for a short distance. However, a distance for data transmission is limited, difficult to meet user requirements on communication in a local area network.

SUMMARY

Implementations of the present disclosure provide a dual-mode low-power wide-area network chip, a method for data transmission, and a terminal.

According to a first aspect, a dual-mode low-power wide-area network (LPWAN) chip is provided. The dual-mode LPWAN chip includes a first LPWAN radio frequency (RF) module, an LPWAN baseband chip, and a second LPWAN RF module.

The first LPWAN RF module is configured to receive first data from an LPWAN input/output device over a first channel between the first LPWAN RF module and the LPWAN input/output device. The LPWAN baseband chip is coupled with the first LPWAN RF module and configured to process the first data into second data. The second LPWAN RF module is coupled with the LPWAN baseband chip and configured to transmit the second data to an external device over a second channel between the second LPWAN RF module and the external device. The second channel is different from the first channel. The first LPWAN RF module has signal coverage smaller than the second LPWAN RF module.

According to a second aspect, a method for data transmission is provided. The method is applicable to a terminal and includes the following. A LPWAN chip is enabled to establish a communication connection with an LPWAN input/output device and to establish a communication connection with an external device. The terminal includes the dual-mode LPWAN chip, and the dual-mode LPWAN chip includes a first LPWAN radio frequency (RF) module, a second LPWAN RF module, and an LPWAN baseband chip coupled with the first LPWAN RF module and the second LPWAN RF module. First data is received, with the first LPWAN RF module, from the LPWAN input/output device over a first channel. The first data is processed into second data with the LPWAN baseband chip. The second data is transmitted, with the second LPWAN RF module, to the external device over a second channel.

According to a third aspect, a terminal is provided. The terminal includes an application processor (AP) and the dual-mode LPWAN chip of the first aspect.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
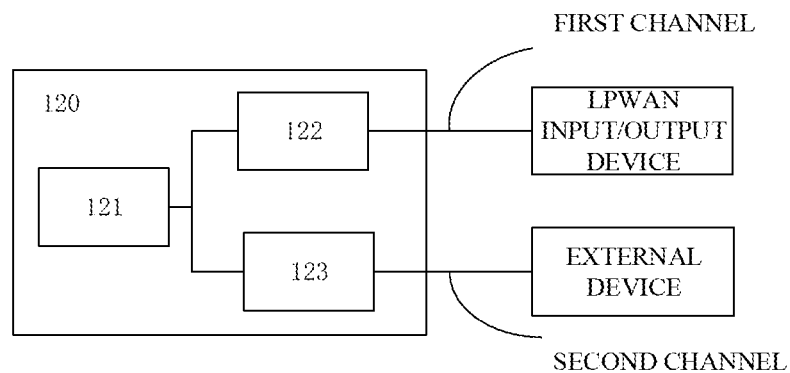
FIG. 1 is a structural schematic diagram of a dual-mode low-power wide-area network (LPWAN) chip according to an implementation of the present disclosure.

In order to enable those skilled in the art to better understand solutions of the present disclosure, technical solutions of the present disclosure will be further described below through implementations with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or apparatus including a series of steps or units is not limited to the listed steps or units; on the contrary, it can optionally include other steps or units that are not listed; alternatively, other steps or units inherent to the process, method, product, or device can be included either.

"Implementation" mentioned in the disclosure means that specific characteristics, structures, or properties described in connection with an implementation may be included in at least one implementation of the disclosure. This word displayed at each position in the specification does not refer to the same implementation as well as an independent or alternate implementation mutually exclusive to other implementations. It may be explicitly and implicitly understood by those skilled in the art that the implementations described in the disclosure may be combined with the other implementations.

A terminal relating to the implementations of the present disclosure may include various devices with wireless communication functions, such as a handheld device, a vehicle-mounted device, a wearable device, a computing device, or other processing device coupled with a wireless modem, and may include various forms of user equipment (UE), mobile stations (MS), terminal devices, and so on.

A low-power wide-area network (LPWAN) is a type of wireless telecommunication wide area network designed to allow long-range communications at a low bit rate among things (connected objects). The long range, low power, and low cost rate distinguish this type of network from a wireless WAN that is designed to connect users or businesses, and carry more data, using more power. Ultra Narrowband (UNB) modulation technology used for LPWAN by various companies can include but is not limited to random phase multiple access (RPMA), Qowisio, DART, Sigfox, Telensa, Nwave, Weightless, DART, NB-Fi Protocol. Currently, there are mainly three types of technologies that cater to different needs of LPWAN market, including LoRa (which is a protocol that operates in unlicensed spectrum), NB-IOT technology (which a protocol that operates in licensed spectrum) supported by 3GPP, and Sigfox technology (which is a protocol that operates ultra-narrowband radios in unlicensed spectrum). Bluetooth is also a type of LPWAN technologies.

Implementations of the present disclosure are described in detail below.

FIG. 1 is a structural schematic diagram of a dual-mode low-power wide-area network (LPWAN) chip 120 according to an implementation of the present disclosure. The dual-mode LPWAN chip 120 includes an LPWAN baseband chip 121, a first LPWAN radio frequency (RF) module 122, and a second LPWAN RF module 123.

The first LPWAN RF module 122 is configured to receive first data from an LPWAN input/output device over a first channel between the first LPWAN RF 122 module and the LPWAN input/output device. The LPWAN baseband chip 121 is coupled with the first LPWAN RF module 122 and configured to process the first data into second data. The second LPWAN RF module 123 is coupled with the LPWAN baseband chip 121 and configured to transmit the second data to an external device over a second channel between the second LPWAN RF module 123 and the external device. The second channel is different from the first channel. The first LPWAN RF module 122 has signal coverage smaller than the second LPWAN RF module 123.

Figure 1A:
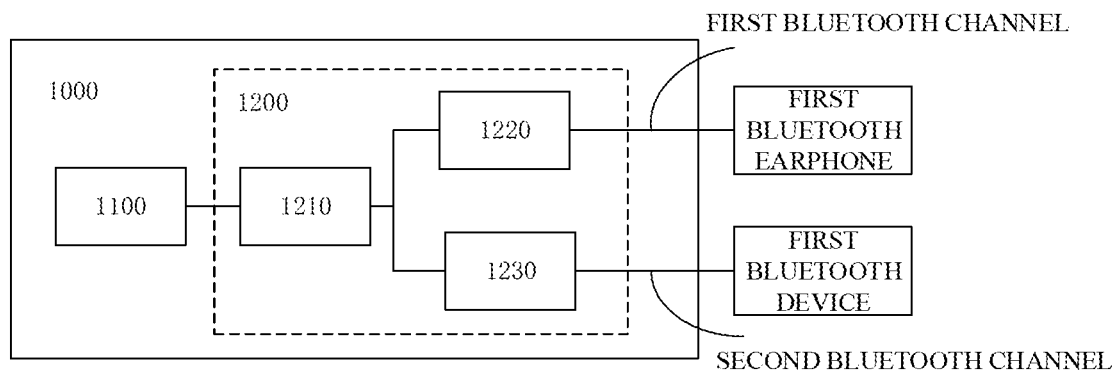
FIG. 1A is a structural schematic diagram of a terminal according to an implementation of the present disclosure.

Referring to FIG. 1A, FIG. 1A is a structural schematic diagram of a terminal 1000 according to an implementation of the present disclosure. The terminal 1000 includes an application processor 1100 and a dual-mode low-power wide-area network (LPWAN) chip coupled with the application processor 1100. The dual-mode LPWAN chip includes a first LPWAN radio frequency (RF) module, an LPWAN baseband chip, and a second LPWAN RF module.

The first LPWAN RF module is configured to receive first data (such as first voice data) from an LPWAN input/output device (such as a Bluetooth earphone) over a first channel (such as a first Bluetooth channel) between the first LPWAN RF module and the LPWAN input/output device. The LPWAN baseband chip is coupled with the first LPWAN RF module and configured to process the first data into second data (such as second voice data). The second LPWAN RF module is coupled with the LPWAN baseband chip and configured to transmit the second data to an external device (such as a Bluetooth device) over a second channel (such as a second Bluetooth channel) between the second LPWAN RF module and the external device. The second channel is different from the first channel. The first LPWAN RF module has signal coverage smaller than the second LPWAN RF module.

In an implementation, the second LPWAN RF module is connected with one or more external devices to form a wireless ad hoc network (ad-hoc).

In an implementation, the dual-mode LPWAN chip is a dual-mode Bluetooth chip. The first LPWAN RF module is a first Bluetooth RF module. The LPWAN baseband chip is a Bluetooth baseband chip. The second LPWAN RF module is a second Bluetooth RF module.

In this implementation, the terminal 1000 includes the application processor 1100 and the dual-mode Bluetooth chip 1200 coupled with the application processor 1100.

The dual-mode Bluetooth chip 1200 includes the Bluetooth baseband chip 1210, the first Bluetooth radio frequency (RF) module 1220, and the second Bluetooth RF module 1230. The Bluetooth baseband chip 1210 is coupled with the first Bluetooth RF module 1220 and the second Bluetooth RF module 1230.

The first Bluetooth RF module 1220 is configured to receive first voice data from a Bluetooth earphone (for example, a first Bluetooth earphone) over a first Bluetooth channel between the first Bluetooth RF module 1220 and the first Bluetooth earphone. The Bluetooth baseband chip 1210 is configured to process the first voice data into second voice data. The second Bluetooth RF module 1230 is configured to transmit the second voice data to a Bluetooth device (for example, a first Bluetooth device) over a second Bluetooth channel between the second Bluetooth RF module 1230 and the first Bluetooth device. The first Bluetooth channel is different from the first Bluetooth channel.

The first Bluetooth RF module 1220 has signal coverage smaller than the second Bluetooth RF module 1230.

The application processor 1100 is a control center of the terminal and is configured to connect various parts of the whole terminal through various interfaces and lines, run or execute software programs and/or modules stored in a memory, and invoke data stored in the memory to perform various functions of the terminal and process data, thereby monitoring the terminal as a whole. The application processor deals mainly with operating systems, user interfaces, applications, and so on.

In an example, the signal coverage may be a sector with the radius of 500 m or 1000 m, which is not limited herein and can be implemented through configuration of software and hardware parameters of the dual-mode Bluetooth chip.

The terminal can achieve data transmission for different distances via or with the first Bluetooth RF module and the second Bluetooth RF module, respectively. Via the first Bluetooth RF module, the terminal performs data transmission for a short distance with the Bluetooth earphone, and via the second Bluetooth module, the terminal performs data transmission for a longer distance with the first Bluetooth device, where the first Bluetooth RF module and the second Bluetooth RF module select different channels so as to improve throughput of voice data streams, which facilitates to extend the application range for the Bluetooth communication function of the terminal, meet various requirements on specific scenarios such as those without mobile networks, etc., and expand functionality and applicability.

Figure 1B:
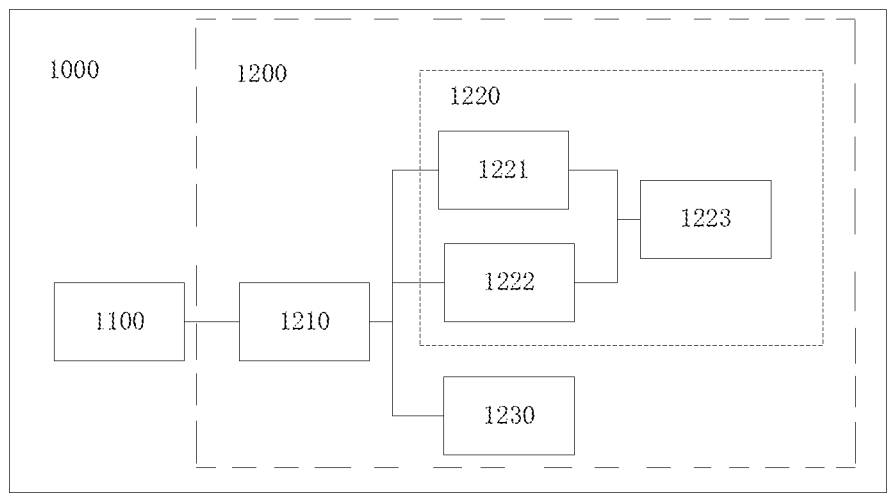
FIG. 1B is a structural schematic diagram of another terminal according to an implementation of the present disclosure.

In one implementation, as illustrated in FIG. 1B, the first Bluetooth RF module 1220 includes a first receiver 1221, a first transmitter 1222, and a first antenna 1223.

The Bluetooth baseband chip 1210 is coupled with the first receiver 1221 and the first transmitter 1222. The first receiver 1221 and the first transmitter 1222 are coupled with the first antenna 1223.

In an example, the first Bluetooth RF module 1220 may be a conventional Bluetooth RF chip that can implement signal transmission within standard signal coverage according to a protocol specification of Bluetooth communication.

In this example, the dual-mode Bluetooth chip uses the conventional Bluetooth RF chip, which facilitates to extend functions while reducing chip complexity as much as possible.

Figure 1C:
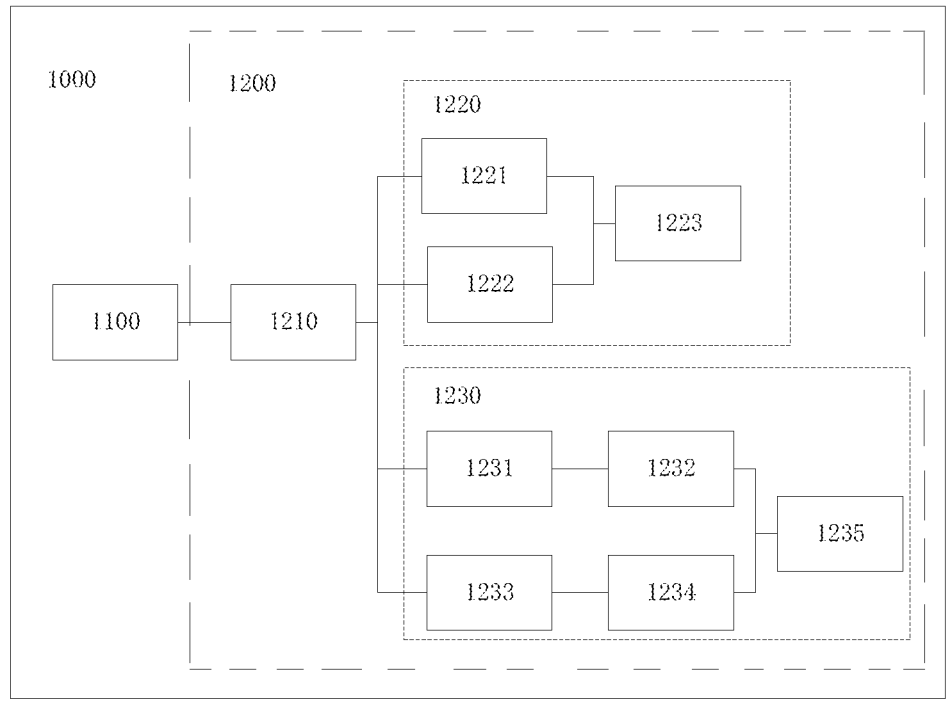
FIG. 1C is a structural schematic diagram of another terminal according to an implementation of the present disclosure.

In one implementation, as illustrated in FIG. 1C, the second Bluetooth RF module 1230 includes a second receiver 1231, a low noise amplifier (LNA) 1232, a second transmitter 1233, a power amplifier (PA) 1234, and second antenna 1235.

The Bluetooth baseband chip 1210 is coupled with the second receiver 1231 and the second transmitter 1233. The second receiver 1231 is coupled with the LNA 1232. The second transmitter 1233 is coupled with the PA 1234. The PA 1234 and the LNA 1232 are coupled with the second antenna 1235.

In an example, in order to achieve Bluetooth signal transmission for larger signal coverage, configuration of the conventional Bluetooth RF module needs to be improved. As such, the conventional Bluetooth RF module is configured as the second Bluetooth RF module, in which the PA is introduced to a signal transmitting link to increase transmitting power of Bluetooth signals and the LNA is introduced to a signal receiving link to improve receiving sensitivity of the Bluetooth signals, thereby enabling a Bluetooth communication function with larger signal coverage and supporting functions such as a voice call in the LAN, etc.

In this example, as can be seen, the terminal can implement enhanced Bluetooth communication via the second Bluetooth RF module, and thus allow devices far from each other to implement Bluetooth communication, which can improve the Bluetooth communication function of the terminal and extend Bluetooth application scenarios.

Figure 1D:
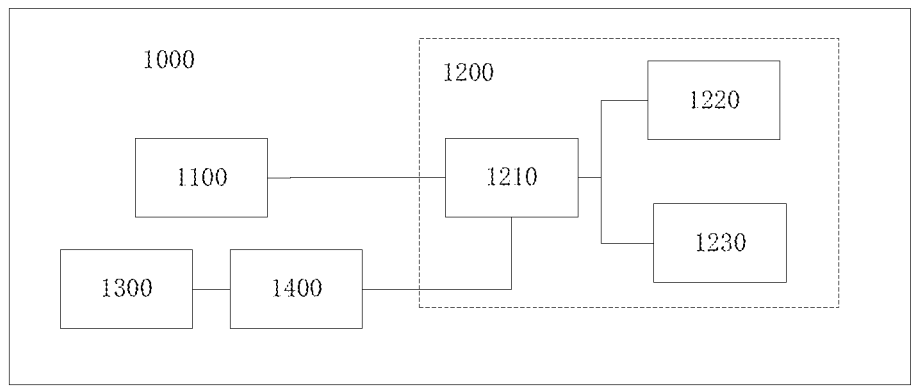
FIG. 1D is a structural schematic diagram of another terminal according to an implementation of the present disclosure.

In one implementation, as illustrated in FIG. 1D, the terminal 1000 further includes a microphone 1300 and an audio coder 1400. The audio coder 1400 is coupled with the Bluetooth baseband chip 1210. The microphone 1300 is coupled with the audio coder 1400.

Figure 1E:
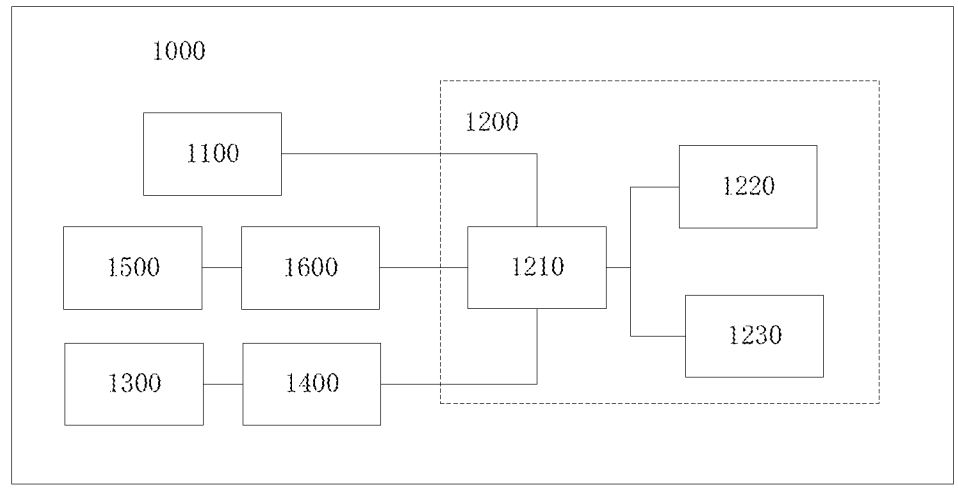
FIG. 1E is a structural schematic diagram of another terminal according to an implementation of the present disclosure.

In one implementation, as illustrated in FIG. 1E, the terminal 1000 further includes a loudspeaker 1500 and an audio decoder 1600. The audio decoder 1600 is coupled with the Bluetooth baseband chip 1210. The loudspeaker 1500 is coupled with the audio decoder 1600.

As can be seen, since the microphone, the audio coder, the loudspeaker, and the audio decoder can process voice data, the terminal can support a voice call function absence of a Bluetooth earphone, which further improves applicability of the Bluetooth communication function of the terminal.

Figure 2A:
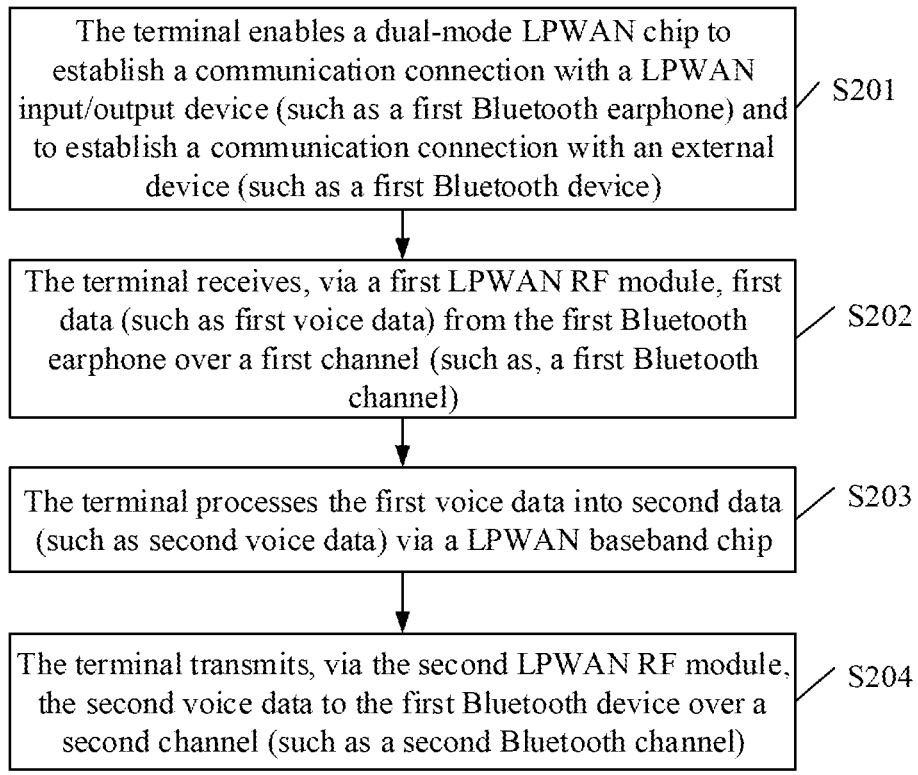
FIG. 2A is a flowchart of a method for data transmission according to an implementation of the present disclosure.

Referring to FIG. 2A, FIG. 2A is a flowchart of a method for data transmission of a terminal according to an implementation of the present disclosure. The method for data transmission is applicable to any of the terminals illustrated in FIG. 1A to FIG. 1E. As illustrated, the method for data transmission includes the following.

At S201, the terminal enables a dual-mode LPWAN chip to establish a communication connection with an LPWAN input/output device (such as a first Bluetooth earphone) and to establish a communication connection with an external device (such as a first Bluetooth device).

In an example, through scanning and pairing procedures, the terminal identifies an identity of the first Bluetooth earphone and establishes a short-distance Bluetooth communication connection with the first Bluetooth earphone, and identifies an identity of the first Bluetooth device and establishes a long-distance Bluetooth communication connection with the first Bluetooth device.

In an example, the first Bluetooth device may be a terminal other than the terminal for establishing the communication connection.

At S202, the terminal receives, via a first LPWAN RF module, first data (such as first voice data) from the first Bluetooth earphone over a first channel (such as, a first Bluetooth channel).

In an example, since the terminal may communicate with the first Bluetooth earphone via the first LPWAN RF module and communicate with the first Bluetooth device via a second LPWAN RF module, respectively, the terminal can implement communication with the first Bluetooth earphone and the first Bluetooth device respectively in a same period over different communication channels, thereby reducing transmission delay for Bluetooth communication.

At S203, the terminal processes the first voice data into second data (such as second voice data) via an LPWAN baseband chip.

In an example, via the LPWAN baseband chip, the terminal may perform the following operations on the first voice data: channel coding, recovery of symbol extraction, cyclic redundancy check (CRC), forward error correction (FEC), encryption and decryption, and so on.

At S204, the terminal transmits, via the second LPWAN RF module, the second voice data to the first Bluetooth device over a second channel (such as a second Bluetooth channel).

According to the implementations of the present disclosure, the terminal first enables the dual-mode LPWAN chip to establish the communication connection with the first Bluetooth earphone and to establish the communication connection with the first Bluetooth device. The terminal then receives the first voice data from the first Bluetooth earphone over the first Bluetooth channel via the first LPWAN RF module. Next, the terminal processes the first voice data into the second voice data via the LPWAN baseband chip. The terminal finally transmits the second voice data to the first Bluetooth device over the second Bluetooth channel via the second LPWAN RF module. It can be seen that the terminal can achieve data transmission for different distances via the first LPWAN RF module and the second LPWAN RF module, respectively. Via the first LPWAN RF module, the terminal performs data transmission for a short distance with the Bluetooth earphone, and via the second Bluetooth module, the terminal performs data transmission for a longer distance with the first Bluetooth device, where the first LPWAN RF module and the second LPWAN RF module select different channels so as to improve throughput of voice data streams, which facilitates to extend the application range for the Bluetooth communication function of the terminal, meet various requirements on specific scenarios such as those without mobile networks, etc., and expand functionality and applicability.

In one implementation, the method for data transmission further includes the following. The terminal receives, via the second LPWAN RF module, target data from the first Bluetooth device over the second Bluetooth channel, where the target data includes any of: position data, map data, and contact data.

It can be seen that, besides transmission of voice data, the terminal can also support long-distance transmission of the target data such as position data, map data, and so on, leading to a comprehensive support of various data types and high adaptability.

In one implementation, the target data includes the position data and the map data. The position data includes global positioning system (GPS) information. The following is further conducted. A preset interface including a portion for displaying positions is displayed by the terminal. According to the position data and the map data, a position is displayed in the portion for displaying positions.

In an example, the preset interface may be an interface preset for displaying the target data.

Figure 2B:
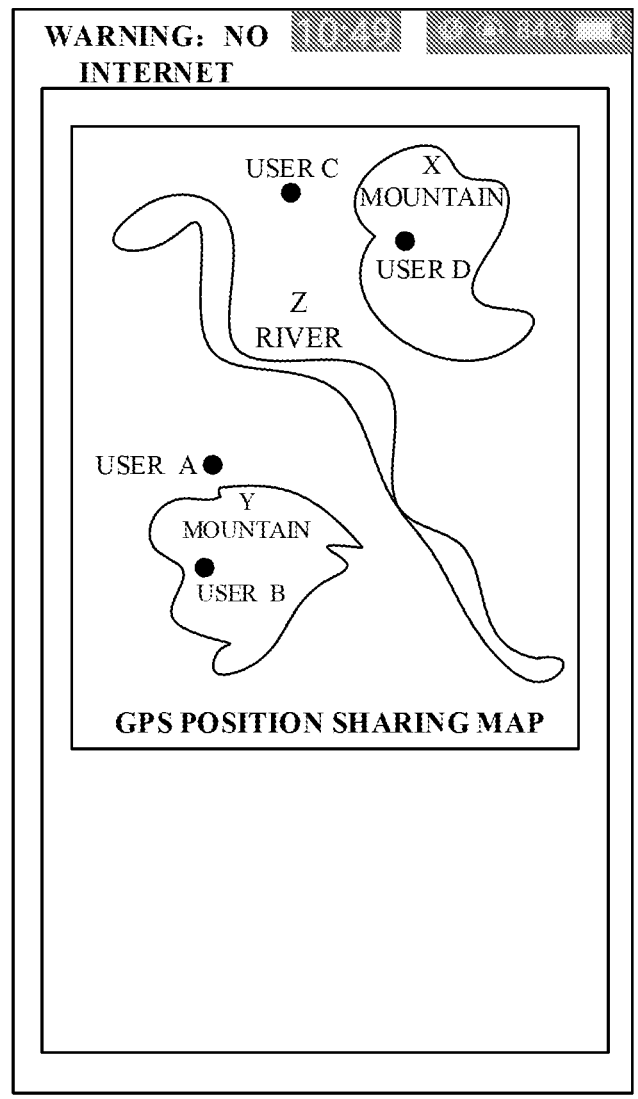
FIG. 2B illustrates an example of a preset interface according to an implementation of the present disclosure.

For example, as illustrated in FIG. 2B, assume that the LAN in which the dual-mode LPWAN chip locates covers a user A, a user B, a user C, and a user D, and the user A, the user B, the user C, and the user D shares position information. The terminal may receive position information shared by other users within the LAN, display a offline map in the portion of the preset interface, and display the position information on the offline map.

It can be seen that, while transmitting the target data in the LAN, the terminal can present the position data through the preset interface so that a user can search in the interface as needed.

In one implementation, the target data includes the contact data. The method for data transmission further includes the following. The terminal displays a preset interface with the contact data. The terminal searches for contact information of a target user from the contact data according to a search request of a user.

It can be seen that the terminal can support long-distance sharing of contact data in the LAN, which improves security and convenience and is applicable to specific scenarios.

In one implementation, the method further includes the following. The terminal transmits a notification for networking to the first Bluetooth device upon detecting that the terminal is networked. The terminal receives a request for networking from the first Bluetooth device and forwards data for networking of the first Bluetooth device. The data for networking is data required to be transmitted through a mobile communication network.

It can be seen that, when the terminal is networked, it may transmit the notification for networking to other devices within the LAN, and thereby provide networking services for a target device requiring networking, expanding communication capability of the terminal.

In the following, a dual-mode Bluetooth chip is illustrated as an example of the dual-mode LPWAN chip, the first Bluetooth RF module is illustrated as an example of the first LPWAN RF module, and the second Bluetooth RF module is illustrated as an example of the second LPWAN RF module.

Figure 3:
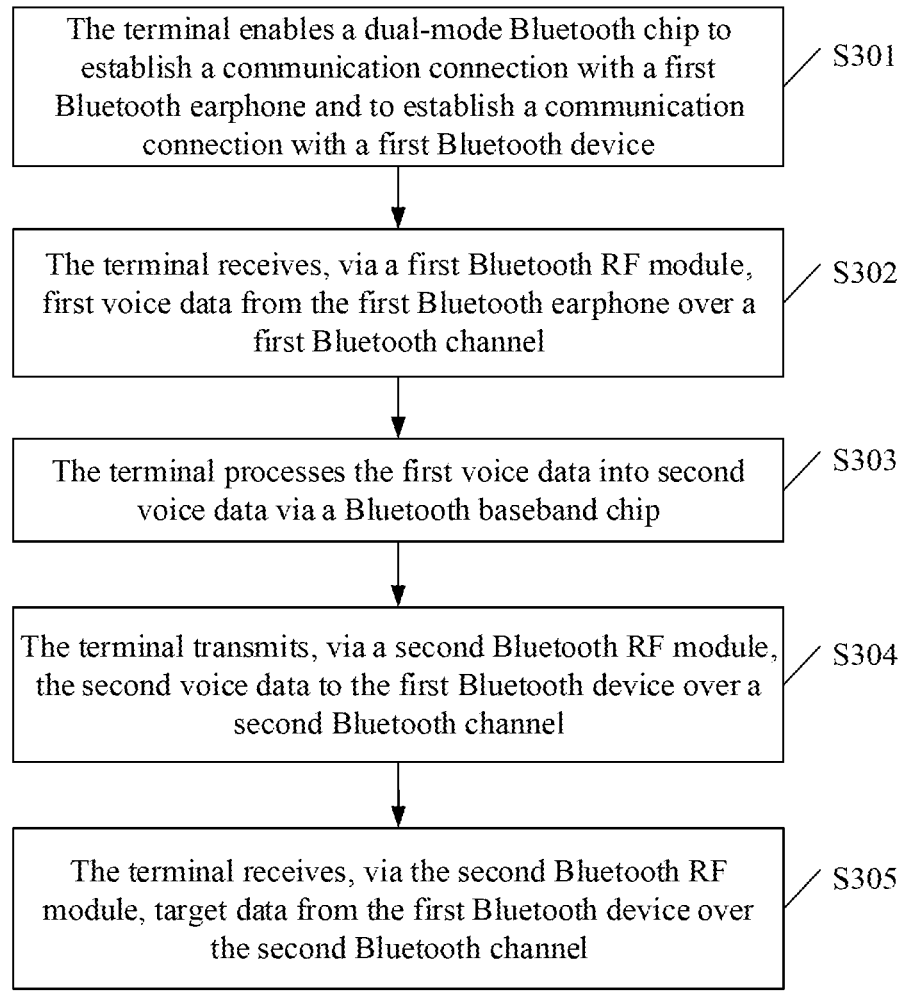
FIG. 3 is a flowchart of another method for data transmission according to an implementation of the present disclosure.

Similar to the implementation illustrated in FIG. 2A, referring to FIG. 3, FIG. 3 is a flowchart of another method for data transmission according to an implementation of the present disclosure. The method is applicable to any of the terminals illustrated in FIG. 1A to FIG. 1E. As illustrated, the method for data transmission includes the following.

At S301, the terminal enables a dual-mode Bluetooth chip to establish a communication connection with a first Bluetooth earphone and to establish a communication connection with a first Bluetooth device.

At S302, the terminal receives, via a first Bluetooth RF module, first voice data from the first Bluetooth earphone over a first Bluetooth channel.

At S303, the terminal processes the first voice data into second voice data via a Bluetooth baseband chip.

At S304, the terminal transmits, via a second Bluetooth RF module, the second voice data to the first Bluetooth device over a second Bluetooth channel.

At S305, the terminal receives, via the second Bluetooth RF module, target data from the first Bluetooth device over the second Bluetooth channel, where the target data includes any of: position data, map data, and contact data.

According to the implementations of the present disclosure, the terminal first enables the dual-mode Bluetooth chip to establish the communication connection with the first Bluetooth earphone and to establish the communication connection with the first Bluetooth device. The terminal then receives the first voice data from the first Bluetooth earphone over the first Bluetooth channel via the first Bluetooth RF module. Next, the terminal processes the first voice data into the second voice data via the Bluetooth baseband chip. The terminal finally transmits the second voice data to the first Bluetooth device over the second Bluetooth channel via the second Bluetooth RF module. It can be seen that the terminal can achieve data transmission for different distances via the first Bluetooth RF module and the second Bluetooth RF module, respectively. Via the first Bluetooth RF module, the terminal performs data transmission for a short distance with the Bluetooth earphone, and via the second Bluetooth module, the terminal performs data transmission for a longer distance with the first Bluetooth device, where the first Bluetooth RF module and the second Bluetooth RF module select different channels so as to improve throughput of voice data streams, which facilitates to extend the application range for the Bluetooth communication function of the terminal, meet various requirements on specific scenarios such as those without mobile networks, etc., and expand functionality and applicability.

In addition, besides transmission of voice data, the terminal can also support long-distance transmission of the target data such as position data, map data, and so on, leading to a comprehensive support of various data types and high adaptability.

Figure 4:
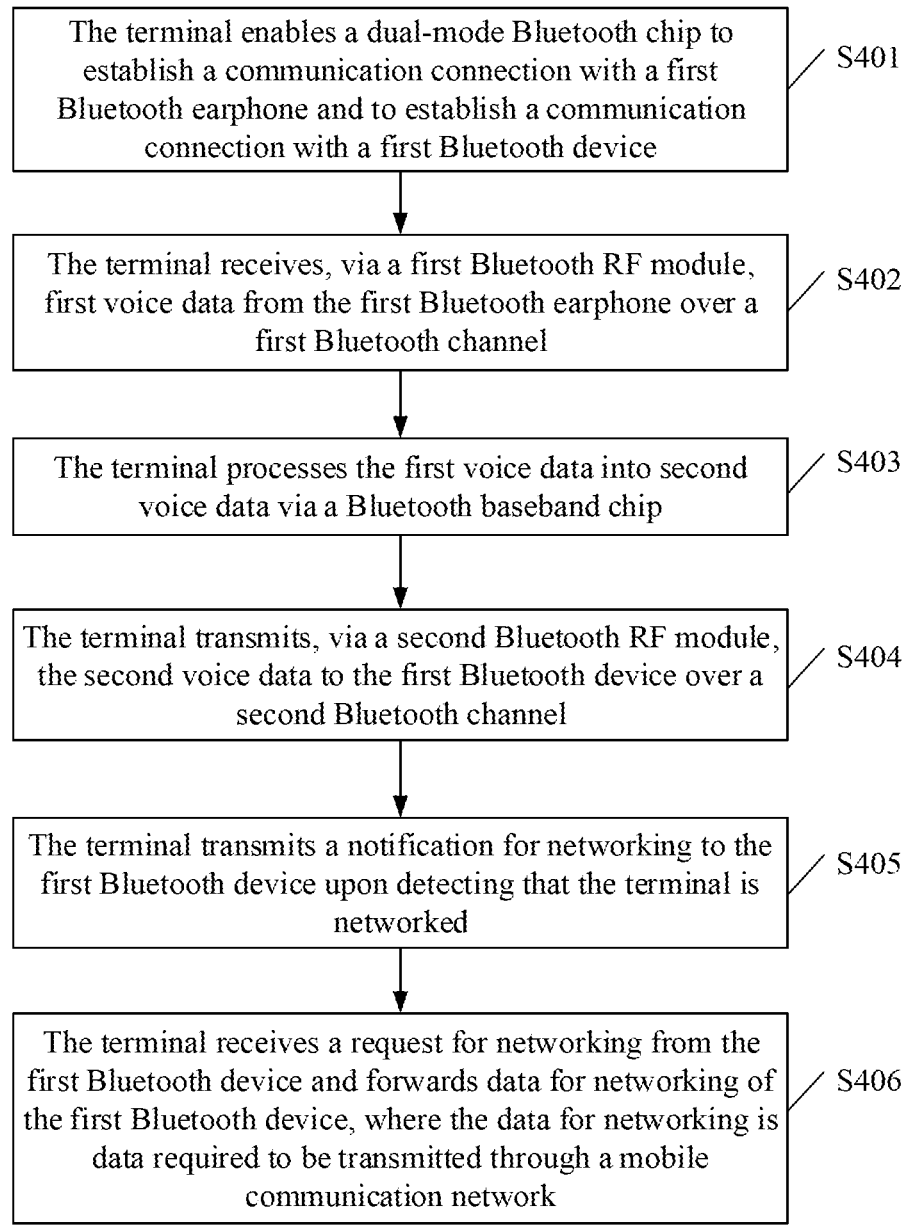
FIG. 4 is a flowchart of another method for data transmission according to an implementation of the present disclosure.

Similar to the implementation illustrated in FIG. 2A, referring to FIG. 4, FIG. 4 is a flowchart of another method for data transmission according to an implementation of the present disclosure. The method is applicable to any of the terminals illustrated in FIG. 1A to FIG. 1E. As illustrated, the method for data transmission includes the following.

At S401, the terminal enables a dual-mode Bluetooth chip to establish a communication connection with a first Bluetooth earphone and to establish a communication connection with a first Bluetooth device.

At S402, the terminal receives, via a first Bluetooth RF module, first voice data from the first Bluetooth earphone over a first Bluetooth channel.

At S403, the terminal processes the first voice data into second voice data via a Bluetooth baseband chip.

At S404, the terminal transmits, via a second Bluetooth RF module, the second voice data to the first Bluetooth device over a second Bluetooth channel.

At S405, the terminal transmits a notification for networking to the first Bluetooth device upon detecting that the terminal is networked.

At S406, the terminal receives a request for networking from the first Bluetooth device and forwards data for networking of the first Bluetooth device, where the data for networking is data required to be transmitted through a mobile communication network.

According to the implementations of the present disclosure, the terminal first enables the dual-mode Bluetooth chip to establish the communication connection with the first Bluetooth earphone and to establish the communication connection with the first Bluetooth device. The terminal then receives the first voice data from the first Bluetooth earphone over the first Bluetooth channel via the first Bluetooth RF module. Next, the terminal processes the first voice data into the second voice data via the Bluetooth baseband chip. The terminal finally transmits the second voice data to the first Bluetooth device over the second Bluetooth channel via the second Bluetooth RF module. It can be seen that the terminal can achieve data transmission for different distances via the first Bluetooth RF module and the second Bluetooth RF module, respectively. Via the first Bluetooth RF module, the terminal performs data transmission for a short distance with the Bluetooth earphone, and via the second Bluetooth module, the terminal performs data transmission for a longer distance with the first Bluetooth device, where the first Bluetooth RF module and the second Bluetooth RF module select different channels so as to improve throughput of voice data streams, which facilitates to extend the application range for the Bluetooth communication function of the terminal, meet various requirements on specific scenarios such as those without mobile networks, etc., and expand functionality and applicability.

In addition, the terminal may transmit the notification for networking to other devices within the LAN, and thereby provide networking services for a target device requiring networking, expanding communication capability of the terminal.

Figure 5:
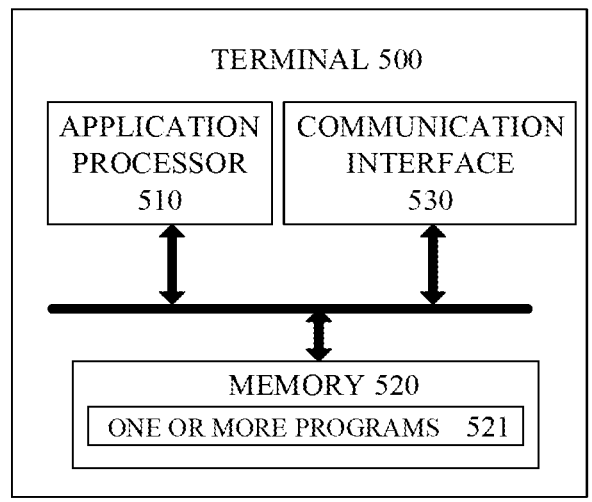
FIG. 5 is a structural schematic diagram of a terminal according to an implementation of the present disclosure.

Similar to the implementations illustrated in FIG. 2A, FIG. 3, and FIG. 4, referring to FIG. 5, FIG. 5 is a structural schematic diagram of a terminal 500 according to an implementation of the present disclosure. As illustrated, the terminal 500 includes an processor 510, a memory 520, a communication interface 530, and one or more programs 521. The one or more programs 521 are stored in the memory 520 and configured to be performed by the processor 510. The one or more programs 521 includes instructions to: enable a dual-mode Bluetooth chip to establish a communication connection with a first Bluetooth earphone and to establish a communication connection with a first Bluetooth device; receive, via a first Bluetooth RF module, first voice data from the first Bluetooth earphone over a first Bluetooth channel; process, via a Bluetooth baseband chip, the first voice data into second voice data; and transmit, via a second Bluetooth RF module, the second voice data to the first Bluetooth device over a second Bluetooth channel.

According to the implementations of the present disclosure, the terminal first enables the dual-mode Bluetooth chip to establish the communication connection with the first Bluetooth earphone and to establish the communication connection with the first Bluetooth device. The terminal then receives the first voice data from the first Bluetooth earphone over the first Bluetooth channel via the first Bluetooth RF module. Next, the terminal processes the first voice data into the second voice data via the Bluetooth baseband chip. The terminal finally transmits the second voice data to the first Bluetooth device over the second Bluetooth channel via the second Bluetooth RF module. It can be seen that the terminal can achieve data transmission for different distances via the first Bluetooth RF module and the second Bluetooth RF module, respectively. Via the first Bluetooth RF module, the terminal performs data transmission for a short distance with the Bluetooth earphone, and via the second Bluetooth module, the terminal performs data transmission for a longer distance with the first Bluetooth device, where the first Bluetooth RF module and the second Bluetooth RF module select different channels so as to improve throughput of voice data streams, which facilitates to extend the application range for the Bluetooth communication function of the terminal, meet various requirements on specific scenarios such as those without mobile networks, etc., and expand functionality and applicability.

In an example, the one or more programs further include instructions to receive, via the second Bluetooth RF module, target data from the first Bluetooth device over the second Bluetooth channel, where the target data includes any of: position data, map data, and contact data.

In an example, the target data includes the position data and the map data. The position data includes global positioning system (GPS) information. The one or more programs further include instructions to display a preset interface including a portion for displaying positions, and to display a position in the portion for displaying positions, according to the position data and the map data.

In an example, the target data includes the contact data. The one or more programs further include instructions to display a preset interface with the contact data, and to search for contact information of a target user from the contact data according to a search request of a user.

In an example, the one or more programs further include instructions to transmit a notification for networking to the first Bluetooth device when detecting that the terminal is networked, and to receive a request for networking from the first Bluetooth device and forward data for networking of the first Bluetooth device, where the data for networking is data required to be transmitted through a mobile communication network.

The foregoing solution of the implementations of the disclosure is mainly described from the viewpoint of execution process of the method. It can be understood that, in order to implement the above functions, the terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the embodiments of the present disclosure is schematic, and is merely a logical function division, and there may be other division manners in actual implementation.

Figure 6:
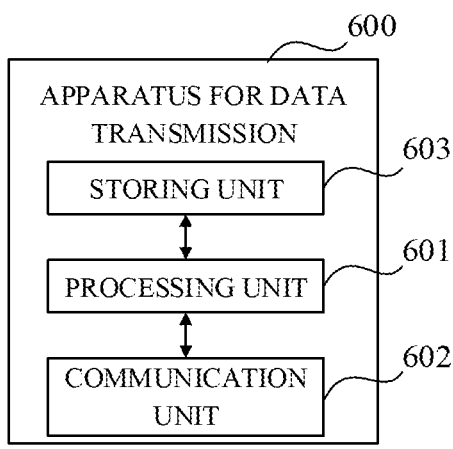
FIG. 6 is a block diagram of functional units of an apparatus for data transmission according to an implementation of the present disclosure.

FIG. 6 is a block diagram of functional units of an apparatus for data transmission 600 according to an implementation of the present disclosure. The apparatus for data transmission 600 is applicable to any of the terminals illustrated in FIG. 1A to FIG. 1E. The apparatus for data transmission 600 includes a processing unit 601 and a communication unit 602.

The processing unit 601 is configured to enable, via the communication unit 602, a dual-mode Bluetooth chip to establish a communication connection with a first Bluetooth earphone and to establish a communication connection with a first Bluetooth device. The processing unit 601 is configured to receive, via a first Bluetooth RF module, first voice data from the first Bluetooth earphone over a first Bluetooth channel. The processing unit 601 is configured to process the first voice data into second voice data via a Bluetooth baseband chip. The processing unit 601 is configured to transmit, via a second Bluetooth RF module, the second voice data to the first Bluetooth device over a second Bluetooth channel.

In an example, the apparatus for data transmission may include a storing unit 603. The storing unit 603 is configured to store program codes and data of the terminal. The processing unit 601 may be an application processor. The communication unit 602 may be an global communication bus, a transceiver, and so on. The storing unit 603 may be an memory.

According to the implementations of the present disclosure, the terminal first enables the dual-mode Bluetooth chip to establish the communication connection with the first Bluetooth earphone and to establish the communication connection with the first Bluetooth device. The terminal then receives the first voice data from the first Bluetooth earphone over the first Bluetooth channel via the first Bluetooth RF module. Next, the terminal processes the first voice data into the second voice data via the Bluetooth baseband chip. The terminal finally transmits the second voice data to the first Bluetooth device over the second Bluetooth channel via the second Bluetooth RF module. It can be seen that the terminal can achieve data transmission for different distances via the first Bluetooth RF module and the second Bluetooth RF module, respectively. Via the first Bluetooth RF module, the terminal performs data transmission for a short distance with the Bluetooth earphone, and via the second Bluetooth module, the terminal performs data transmission for a longer distance with the first Bluetooth device, where the first Bluetooth RF module and the second Bluetooth RF module select different channels so as to improve throughput of voice data streams, which facilitates to extend the application range for the Bluetooth communication function of the terminal, meet various requirements on specific scenarios such as those without mobile networks, etc., and expand functionality and applicability.

In an example, the processor unit 602 is further configured to receive, via the second Bluetooth RF module, target data from the first Bluetooth device over the second Bluetooth channel, where the target data includes any of: position data, map data, and contact data.

In an example, the target data includes the position data and the map data. The position data includes global positioning system (GPS) information. The processor unit 602 is further configured to display a preset interface including a portion for displaying positions, and to display a position in the portion for displaying positions, according to the position data and the map data.

In an example, the target data includes the contact data. The processor unit 602 is further configured to display a preset interface with the contact data, and to search for contact information of a target user from the contact data according to a search request of a user.

In an example, the processor unit 602 is further configured to transmit a notification for networking to the first Bluetooth device when detecting that the terminal is networked, and to receive a request for networking from the first Bluetooth device and forward data for networking of the first Bluetooth device, where the data for networking is data required to be transmitted through a mobile communication network.

Implementations of the present disclosure also provide a non-transitory computer storage medium. The non-transitory computer readable storage medium is configured to store computer programs for electronic data interchange. The computer programs are operable with a computer to execute some or all of operations of any of the methods described in method implementations of the present disclosure. The computer may be a terminal.

Implementations of the present disclosure also provide a computer program product. The computer program product includes a non-transitory computer-readable storage medium that stores computer programs. The computer programs are operable with a computer to execute some or all of operations of any of the methods described in method implementations of the present disclosure. The computer program product may be a software installation package. The computer may be a terminal.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed herein may be implemented in other manners. For example, the device/apparatus implementations described above are merely illustrative. For instance, the division of the unit is only a logical function division and there can be other manners of division during actual implementations. For example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated. The components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, and the program may be stored in a computer-readable memory, which may include a flash memory, a ROM, a RAM, magnetic disk, CD, and so on.

The implementations of the present disclosure have been described in detail above. The principles and implementations of the present disclosure are described in the specific examples. The description of the above implementations is only used to help understand the method and core ideas of the present disclosure. For those skilled in the art, the details of the implementations and the application range can be changed according to the idea of the present disclosure. In summary, the content of the present disclosure should not be construed as limiting the present application.

What is claimed is:

1. A dual-mode low-power wide-area network (LPWAN) chip, comprising:
   a first LPWAN radio frequency (RF) module, configured to receive first data from an LPWAN input/output device over a first channel between the first LPWAN RF module and the LPWAN input/output device;
   an LPWAN baseband chip, coupled with the first LPWAN RF module and configured to process the first data into second data; and
   a second LPWAN RF module, coupled with the LPWAN baseband chip and configured to transmit the second data to an external device over a second channel between the second LPWAN RF module and the external device,
   the second channel being different from the first channel; and
   the first LPWAN RF module having signal coverage smaller than the second LPWAN RF module,
   wherein the LPWAN baseband chip is a Bluetooth baseband chip, and the Bluetooth baseband chip is configured to perform at least one of channel coding, recovery of symbol extraction, or encryption and decryption on the first data.

2. The dual-mode LPWAN chip of claim 1, wherein the second LPWAN RF module is connected with one or more external devices to form a wireless ad hoc network (ad-hoc).

3. The dual-mode LPWAN chip of claim 1, wherein the dual-mode LPWAN chip is a dual-mode Bluetooth chip, the first LPWAN RF module is a first Bluetooth RF module, and the second LPWAN RF module is a second Bluetooth RF module.

4. The dual-mode LPWAN chip of claim 3, wherein the first Bluetooth RF module comprises:
   a receiver and a transmitter, coupled with the Bluetooth baseband chip; and
   an antenna, coupled with the receiver and the transmitter.

5. The dual-mode LPWAN chip of claim 3, wherein the second Bluetooth RF module comprises:
   a receiver and a transmitter, coupled with the Bluetooth baseband chip;
   a low noise amplifier (LNA), coupled with the receiver;
   a power amplifier (PA), coupled with the transmitter; and
   an antenna, coupled with the PA and the LNA.

6. A method for data transmission of a terminal, comprising:
   enabling, by a terminal, a dual-mode low-power wide-area network (LPWAN) chip to establish a communication connection with an LPWAN input/output device and to establish a communication connection with an external device, wherein the terminal comprises the dual-mode LPWAN chip, and the dual-mode LPWAN chip comprises a first LPWAN radio frequency (RF) module, a second LPWAN RF module, and an LPWAN baseband chip coupled with the first LPWAN RF module and the second LPWAN RF module;
   receiving, with the first LPWAN RF module, first data from the LPWAN input/output device over a first channel;
   processing, with the LPWAN baseband chip, the first data into second data; and
   transmitting, with the second LPWAN RF module, the second data to the external device over a second channel different from the first channel,
   wherein the LPWAN baseband chip is a Bluetooth baseband chip, and wherein processing, with the LPWAN baseband chip, the first data into the second data comprises:
   performing, with the Bluetooth baseband chip, at least one of channel coding, recovery of symbol extraction, or encryption and decryption on the first data.

7. The method of claim 6, the second LPWAN RF module is connected with one or more external devices to form a wireless ad hoc network (ad-hoc).

8. The method of claim 6, wherein the dual-mode LPWAN chip is a dual-mode Bluetooth chip, the first LPWAN RF module is a first Bluetooth RF module, and the second LPWAN RF module is a second Bluetooth RF module.

9. The method of claim 8, further comprising:
   receiving, via the second Bluetooth RF module, target data from the external device over the second channel, wherein the target data comprises any of: position data, map data, and contact data.

10. The method of claim 9, wherein the target data comprises the position data and the map data and the position data comprises global positioning system (GPS) information, and the method further comprises:
- displaying a preset interface comprising a portion for displaying positions; and
- displaying a position in the portion for displaying positions, according to the position data and the map data.

11. The method of claim 9, wherein the target data comprises the contact data, and the method further comprises:
- displaying a preset interface with the contact data; and
- searching for contact information of a target user from the contact data according to a search request of a user.

12. The method of claim 8, wherein enabling, by the terminal, the dual-mode Bluetooth chip to establish the communication connection with the LPWAN input/output device and to establish the communication connection with the external device comprises:
- identifying an identity of the LPWAN input/output device and establishing a short-distance Bluetooth communication connection with the LPWAN input/output device through scanning and pairing, and
- identifying an identity of the external device and establishing a long-distance Bluetooth communication connection with the external device through scanning and pairing.

13. The method of claim 6, further comprising:
- transmitting a notification for networking to the external device upon detecting that the terminal is networked; and
- receiving a request for networking from the external device and forwarding data for networking of the external device, wherein the data for networking is data required to be transmitted through a mobile communication network.

14. A terminal, comprising an application processor (AP) and a dual-mode low-power wide-area network (LPWAN) chip, the dual-mode LPWAN chip comprising:
- a first LPWAN radio frequency (RF) module, configured to receive first data from an LPWAN input/output device over a first channel between the first LPWAN RF module and the LPWAN input/output device;
- an LPWAN baseband chip, coupled with the first LPWAN RF module and configured to process the first data into second data; and
- a second LPWAN RF module, coupled with the LPWAN baseband chip and configured to transmit the second data to an external device over a second channel between the second LPWAN RF module and the external device,
  - the second channel being different from the first channel; and
  - the first LPWAN RF module having signal coverage smaller than the second LPWAN RF module,
- wherein the LPWAN baseband chip is a Bluetooth baseband chip, and the Bluetooth baseband chip is configured to perform at least one of channel coding, recovery of symbol extraction, or encryption and decryption on the first data.

15. The terminal of claim 14, wherein the second LPWAN RF module is connected with one or more external devices to form a wireless ad hoc network (ad-hoc).

16. The terminal of claim 14, wherein the dual-mode LPWAN chip is a dual-mode Bluetooth chip, the first LPWAN RF module is a first Bluetooth RF module, and the second LPWAN RF module is a second Bluetooth RF module.

17. The terminal of claim 16, wherein the first Bluetooth RF module comprises:
- a receiver and a transmitter, coupled with the Bluetooth baseband chip; and
- an antenna, coupled with the receiver and the transmitter.

18. The terminal of claim 16, wherein the second Bluetooth RF module comprises:
- a receiver and a transmitter, coupled with the Bluetooth baseband chip;
- a low noise amplifier (LNA), coupled with the receiver;
- a power amplifier (PA), coupled with the transmitter; and
- an antenna, coupled with the PA and the LNA.

19. The terminal of claim 16, further comprising:
- an audio coder, coupled with the Bluetooth baseband chip; and
- a microphone, coupled with the audio coder.

* * * * *